United States Patent
Kawashima et al.

(10) Patent No.: US 12,420,847 B2
(45) Date of Patent: Sep. 23, 2025

(54) CONTROLLER, METHOD, AND RECORDING MEDIUM FOR REDUCING FREQUENCY OF AUTONOMOUS CONTROL LEVEL APPLICATION

(71) Applicants: TOYOTA JIDOSHA KABUSHIKI KAISHA, Toyota (JP); DENSO CORPORATION, Kariya (JP)

(72) Inventors: Wataru Kawashima, Nisshin (JP); Ryusuke Kuroda, Tokyo-to (JP); Kenichiro Aoki, Machida (JP); Takehiko Hanada, Hiratsuka (JP); Takuya Fujiki, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 136 days.

(21) Appl. No.: 18/449,146

(22) Filed: Aug. 14, 2023

(65) Prior Publication Data
US 2024/0067233 A1    Feb. 29, 2024

(30) Foreign Application Priority Data
Aug. 25, 2022    (JP) .................. 2022-134365

(51) Int. Cl.
*B60W 60/00*    (2020.01)
(52) U.S. Cl.
CPC ..... *B60W 60/0059* (2020.02); *B60W 2540/10* (2013.01); *B60W 2540/18* (2013.01)

(58) Field of Classification Search
None
See application file for complete search history.

(56) References Cited

U.S. PATENT DOCUMENTS

| | | | |
|---|---|---|---|
| 2019/0278267 A1 | 9/2019 | Honda | |
| 2023/0339515 A1* | 10/2023 | Hayakawa | B60W 60/0027 |
| 2024/0083466 A1* | 3/2024 | Jang | B60W 60/0053 |
| 2024/0270237 A1* | 8/2024 | Yoda | B60W 30/14 |

FOREIGN PATENT DOCUMENTS

| | | |
|---|---|---|
| JP | 2018169806 A | 11/2018 |
| JP | 2019109666 A | 7/2019 |
| JP | 2019155956 A | 9/2019 |

\* cited by examiner

*Primary Examiner* — James J Lee
*Assistant Examiner* — Jonathan E Reinert
(74) *Attorney, Agent, or Firm* — Dickinson Wright, PLLC

(57) ABSTRACT

When an object that may possibly collide with a vehicle is detected from a sensor signal of one of sensors mounted on the vehicle, a vehicle controller changes the level of autonomous driving control applied to the vehicle from a first level that does not require a driver to operate an accelerator and steering and does not require the driver to look around the vehicle to a second level that requires the driver to look around the vehicle but does not require the driver to operate an accelerator and steering. When an object that may possibly collide with the vehicle is detected from sensor signals of two or more of the sensors, the vehicle controller changes the level of autonomous driving control from the first level to a third level that requires the driver to operate at least an accelerator or steering.

5 Claims, 5 Drawing Sheets

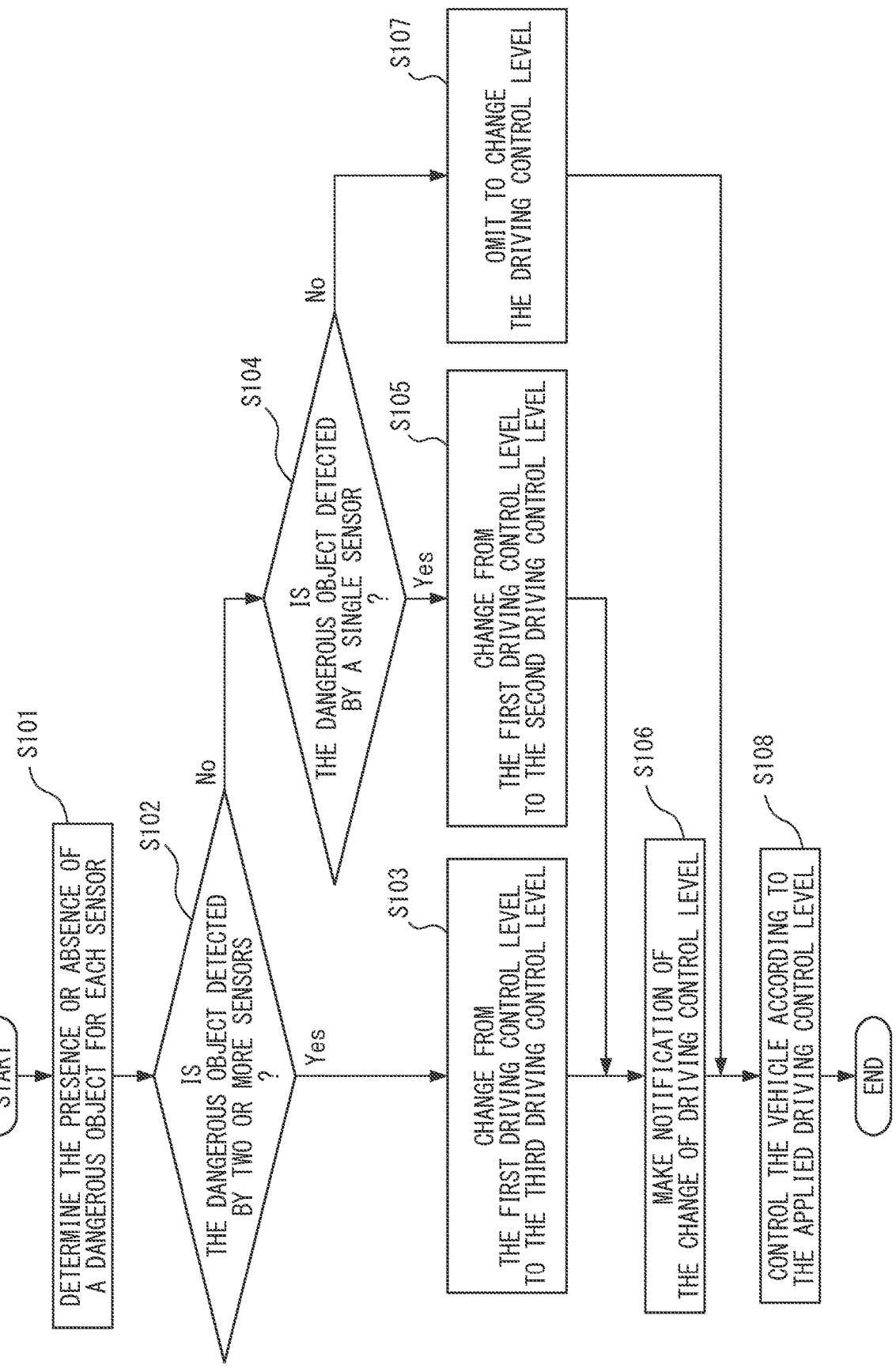

CONTROLLER, METHOD, AND RECORDING MEDIUM FOR REDUCING FREQUENCY OF AUTONOMOUS CONTROL LEVEL APPLICATION

FIELD

The present invention relates to a controller, a method, and a computer program for autonomous driving control of a vehicle.

BACKGROUND

In a vehicle to which autonomous driving control is applicable, the environment around the vehicle or a driver's operation of the vehicle may cause a switch of driving control of the vehicle from a vehicle controller to the vehicle driver. Techniques to execute such a switch of control appropriately have been proposed (see Japanese Unexamined Patent Publications JP2019-155956A, JP2018-169806A, and JP2019-109666A).

The state of control of a vehicle controller described in JP2019-155956A includes a first state and a second state in which the level of automation of control is higher than in the first state. In the vehicle controller, a driver's operation for finishing the first state differs from that for finishing the second state, or ways to determine the operation differ among the first and second states.

A driving support device disclosed in JP2018-169806A controls transfer of authority to drive to a driver according to the driver's level of recognition of the situation. Specifically, the driving support device controls the transfer so that the degree of transfer of authority gradually changes over a transition time as necessary.

A method for supporting driving disclosed in JP2019-109666A includes determining whether a section on a travel route is a mode switching section where the state of travel of a host vehicle is switched from autonomous driving mode to manual driving mode when it is difficult to continue autonomous driving because of a road structure. The method further includes determining whether a lane change section where the host vehicle makes a lane change and a mode switching section connect on the travel route, and continuing manual driving mode between a point in a lane change section at which a lane change is made by manual driving and a mode switching section when the lane change section connects with the mode switching section and is too congested to make a lane change by autonomous driving.

SUMMARY

Even when a driving control level that does not require a driver to be involved in driving operation can be applied to a vehicle, frequent changes from the driving control level to one that requires the driver to be involved in driving operation may be troublesome to the driver.

It is an object of the present invention to provide a vehicle controller that can reduce the frequency of application of a driving control level that requires a driver to be involved in driving operation.

According to an embodiment, a vehicle controller is provided. The vehicle controller is capable of autonomous driving control of a vehicle at a first level that does not require a driver of the vehicle to operate an accelerator and steering and does not require the driver to look around the vehicle, a second level that requires the driver to look around the vehicle but does not require the driver to operate an accelerator and steering, or a third level that requires the driver to operate at least an accelerator or steering. The vehicle controller includes a processor configured to: detect, for each of a plurality of sensors mounted on the vehicle, an object in an area around the vehicle, based on a sensor signal from the sensor, the sensors being capable of detecting objects around the vehicle, determine whether the vehicle may possibly collide with the detected object, change the level of autonomous driving control applied to the vehicle from the first level to the second level when an object determined as possibly colliding with the vehicle is detected on the basis of the sensor signal of one of the sensors in the case where autonomous driving control at the first level is applied to the vehicle, and change the level of autonomous driving control applied to the vehicle from the first level to the third level when an object determined as possibly colliding with the vehicle is detected on the basis of the sensor signals of two or more of the sensors.

The processor of the vehicle controller is preferably further configured to change the level of autonomous driving control applied to the vehicle from the second level to the third level when an object determined as possibly colliding with the vehicle is detected on the basis of the sensor signals of two or more of the sensors in the case where autonomous driving control at the second level is applied to the vehicle.

The processor of the vehicle controller is preferably further configured to change the level of autonomous driving control applied to the vehicle from the second level to the first level when an object determined as possibly colliding with the vehicle has not been detected from any of the sensor signals of the sensors for a predetermined period in the case where autonomous driving control at the second level is applied to the vehicle.

According to another embodiment, a method for vehicle control is provided. The vehicle control enables autonomous driving control of a vehicle at a first level that does not require a driver of the vehicle to operate an accelerator and steering and does not require the driver to look around the vehicle, a second level that requires the driver to look around the vehicle but does not require the driver to operate an accelerator and steering, or a third level that requires the driver to operate at least an accelerator or steering. The method includes detecting, for each of a plurality of sensors mounted on the vehicle, an object in an area around the vehicle, based on a sensor signal from the sensor, the sensors being capable of detecting objects around the vehicle; determining whether the vehicle may possibly collide with the detected object; changing the level of autonomous driving control applied to the vehicle from the first level to the second level when an object determined as possibly colliding with the vehicle is detected on the basis of the sensor signal of one of the sensors in the case where autonomous driving control at the first level is applied to the vehicle; and changing the level of autonomous driving control applied to the vehicle from the first level to the third level when an object determined as possibly colliding with the vehicle is detected on the basis of the sensor signals of two or more of the sensors.

According to still another embodiment, a non-transitory recording medium that stores a computer program for vehicle control is provided. The vehicle control enables autonomous driving control of a vehicle at a first level that does not require a driver of the vehicle to operate an accelerator and steering and does not require the driver to look around the vehicle, a second level that requires the driver to look around the vehicle but does not require the driver to operate an accelerator and steering, or a third level that requires the driver to operate at least an accelerator or steering. The computer program causing a processor mounted on the vehicle to execute a process including detecting, for each of a plurality of sensors mounted on the vehicle, an object in an area around the vehicle, based on a sensor signal from the sensor, the sensors being capable of detecting objects around the vehicle; determining whether the vehicle may possibly collide with the detected object; changing the level of autonomous driving control applied to the vehicle from the first level to the second level when an object determined as possibly colliding with the vehicle is detected on the basis of the sensor signal of one of the sensors in the case where autonomous driving control at the first level is applied to the vehicle; and changing the level of autonomous driving control applied to the vehicle from the first level to the third level when an object determined as possibly colliding with the vehicle is detected on the basis of the sensor signals of two or more of the sensors.

The vehicle controller according to the present disclosure has an advantageous effect of being able to reduce the frequency of application of a driving control level that requires a driver to be involved in driving operation.

BRIEF DESCRIPTION OF DRAWINGS

FIG. 5 is an operation flowchart of the vehicle control process.

DESCRIPTION OF EMBODIMENTS

A vehicle controller, a method for vehicle control executed by the vehicle controller, and a computer program for vehicle control will now be described with reference to the attached drawings. When control at a first driving control level is applied to a host vehicle, the vehicle controller detects an object in an area around the host vehicle, based on sensor signals obtained from sensors mounted on the host vehicle, and determines whether the host vehicle may possibly collide with the detected object. The vehicle controller controls the level of driving control applied to the host vehicle, depending on the number of sensors that have generated sensor signals from which the object determined as possibly colliding with the host vehicle is detected. In particular, when such an object is detected on the basis of a sensor signal of a single sensor, the vehicle controller changes the level of autonomous driving control applied to the vehicle from the first driving control level to a second driving control level in which the level of autonomous driving is lower than in the first driving control level. When such an object is detected on the basis of sensor signals of two or more sensors, the vehicle controller changes the level of autonomous driving control applied to the vehicle from the first driving control level to a third driving control level in which the level of autonomous driving is lower than in the second driving control level.

In the present embodiment, the first driving control level (first level) does not require a driver to operate an accelerator and steering or to look around the vehicle. For example, the first driving control level may be level 3 autonomous driving control defined by the Society of Automotive Engineers (SAE). The second driving control level (second level) requires the driver to look around the vehicle but does not require the driver to operate an accelerator and steering, and may be, for example, level 2 autonomous driving control defined by SAE. The third driving control level (third level) requires the driver to operate at least an accelerator or steering, and may be, for example, level 0 or 1 autonomous driving control defined by SAE.

Figure 1:
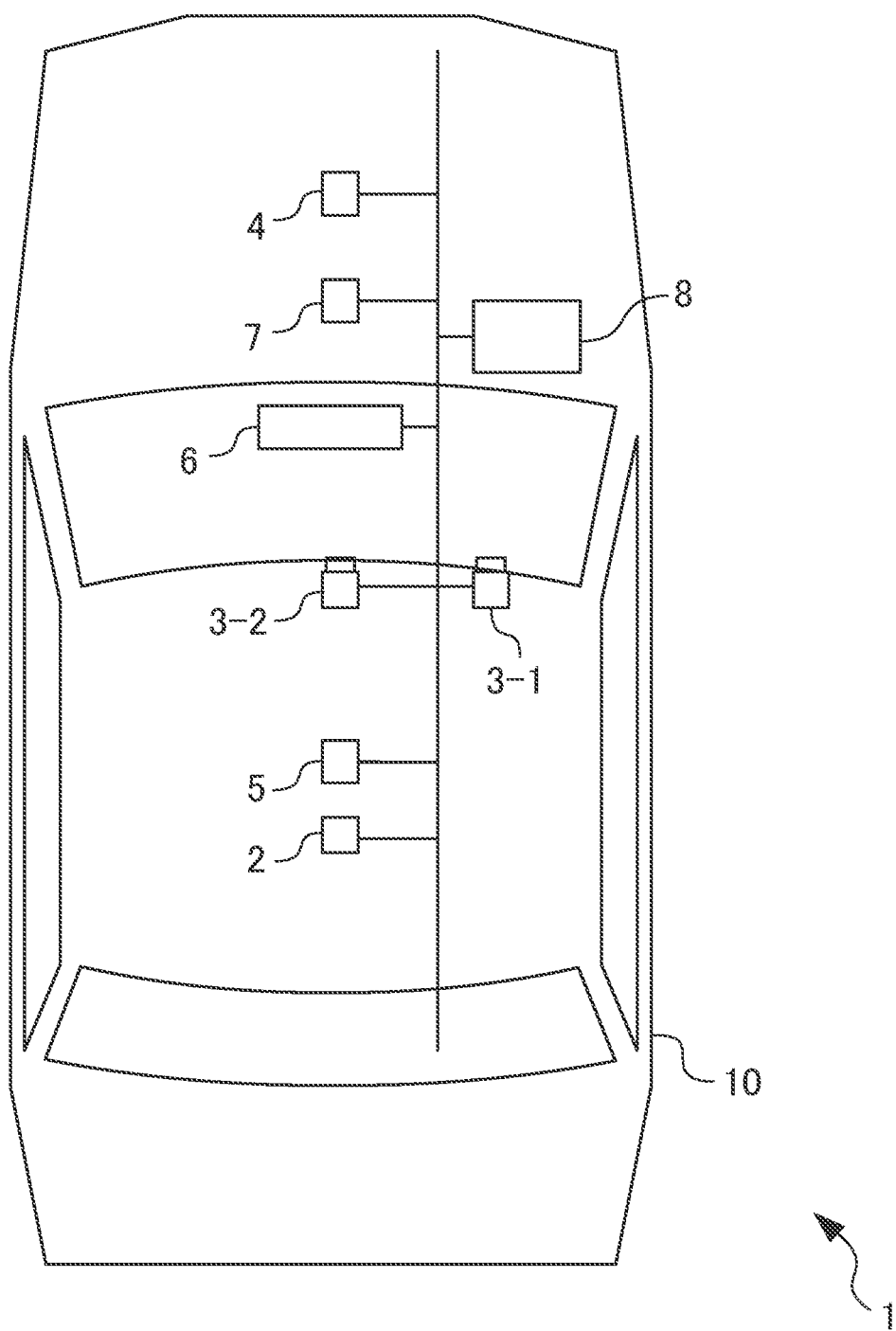
FIG. 1 schematically illustrates the configuration of a vehicle control system equipped with a vehicle controller.
Figure 2:
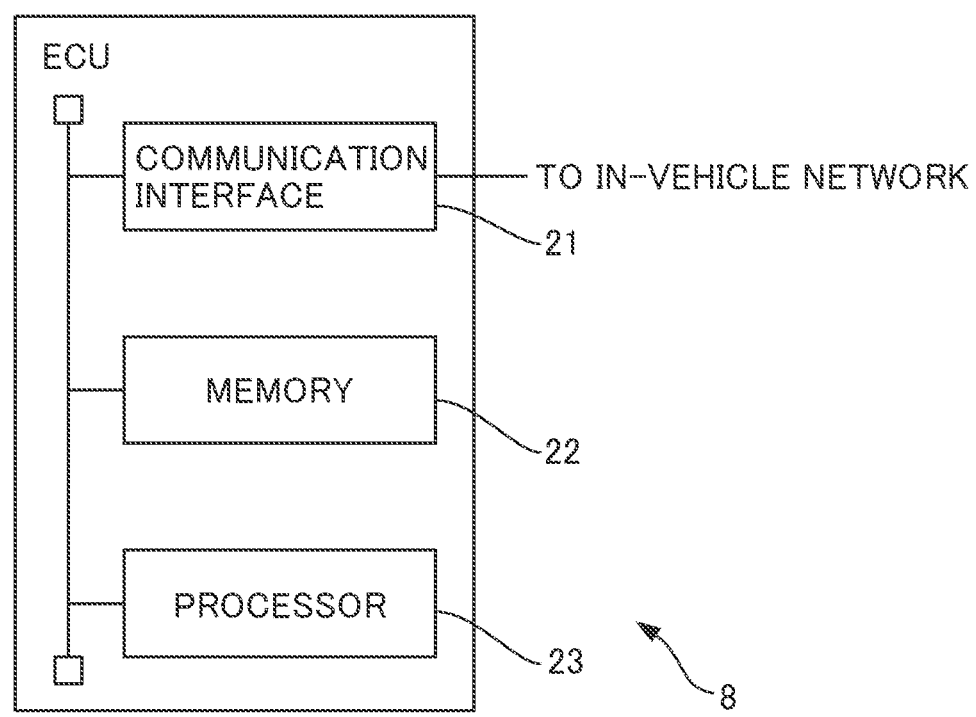
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. The vehicle control system 1 is mounted on a vehicle 10 and controls the vehicle 10. To achieve this, the vehicle control system 1 includes a GPS receiver 2, two cameras 3-1 and 3-2, a range sensor 4, a wireless communication terminal 5, a user interface 6, a storage device 7, and an electronic control unit (ECU) 8, which is an example of the vehicle controller. The GPS receiver 2, the cameras 3-1 and 3-2, the range sensor 4, the wireless communication terminal 5, the user interface 6, and the storage device 7 are communicably connected to the ECU 8 via an in-vehicle network conforming to a standard such as a controller area network. The vehicle 10 is an example of the host vehicle. The vehicle control system 1 may further include a navigation device (not illustrated) that searches for a planned travel route to a destination.

The GPS receiver 2 receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 8 via the in-vehicle network at predetermined intervals. Instead of the GPS receiver 2, the vehicle 10 may include a receiver conforming to a satellite positioning system. In this case, the receiver determines the position of the vehicle 10.

The cameras 3-1 and 3-2 are an example of sensors capable of detecting objects around the vehicle 10. The cameras 3-1 and 3-2 each include a two-dimensional detector constructed from an array of optoelectronic transducers, such as CCD or C-MOS, having sensitivity to visible light and a focusing optical system that forms an image of a target region on the two-dimensional detector. The focal length of the focusing optical system of the camera 3-1 is shorter than that of the camera 3-2. In other words, the camera 3-1 can take pictures of a larger region than the camera 3-2 can whereas the camera 3-2 can take pictures of a farther region under magnification than the camera 3-1 can. The cameras 3-1 and 3-2 are mounted, for example, in the interior of the vehicle 10 so as to be oriented, for example, to the front of the vehicle 10. Thus, the region captured by the camera 3-1 at least partially overlaps the region captured by the camera 3-2. The cameras 3-1 and 3-2 each take pictures of a region in front of the vehicle 10 every predetermined capturing period (e.g., 1/30 to 1/10 seconds), and generate images representing the region. Each image obtained by the cameras 3-1 and 3-2 is an example of the sensor signal, and may be a color or grayscale image. The vehicle 10 may include three or more cameras taking pictures in different orientations or having different focal lengths. For example, the vehicle 10 may include a camera oriented to the side or the rear of the vehicle 10, besides the cameras 3-1 and 3-2.

Every time an image is generated, the cameras 3-1 and 3-2 each output the generated image to the ECU 8 via the in-vehicle network.

The range sensor 4 is another example of a sensor capable of detecting objects around the vehicle 10. The range sensor 4 may be configured as, for example, LiDAR, radar, or sonar. For each bearing within a predetermined measurement area around the vehicle 10, the range sensor 4 generates a ranging signal indicating the distance to an object in the bearing at predetermined intervals. The ranging signal is another example of the sensor signal. The range sensor 4 is oriented to the front of the vehicle 10 so that, for example, its measurement area at least partially overlaps the region captured by the camera 3-1 or 3-2. Alternatively, the range sensor 4 may be mounted on the vehicle 10 so that its measurement area does not overlap the regions captured by the cameras 3-1 and 3-2. The vehicle 10 may include multiple range sensors measuring in different orientations or having different measurement areas. For example, another range sensor whose measurement area is beside or behind the vehicle 10 may be provided besides the range sensor 4 whose measurement area is in front of the vehicle 10. In addition, the vehicle 10 may include multiple range sensors of different types. For example, the vehicle 10 may include LiDAR and radar as range sensors.

Every time a ranging signal is generated, the range sensor 4 outputs the generated ranging signal to the ECU 8 via the in-vehicle network.

The wireless communication terminal 5 communicates with a wireless base station by wireless in conformity with a predetermined standard of mobile communications. The wireless communication terminal 5 receives traffic information indicating the traffic situation of a road being traveled by the vehicle 10 or an area therearound from another device via the wireless base station. The wireless communication terminal 5 outputs the received traffic information to the ECU 8 via the in-vehicle network. The wireless communication terminal 5 may receive a high-precision map of a predetermined region around the current position of the vehicle 10, which is used for autonomous driving control, from a map server via the wireless base station, and output the received high-precision map to the storage device 7.

The user interface 6, which is an example of a notification unit, includes, for example, a display, such as a liquid crystal display, or a touch screen display. The user interface 6 is mounted in the interior of the vehicle 10, e.g., near an instrument panel, so as to face the driver. The user interface 6 displays various types of information received from the ECU 8 via the in-vehicle network, in the form of an icon or text, to notify the driver of the information. The user interface 6 may include one or more light sources provided on the instrument panel, a speaker mounted in the vehicle interior, or a vibrator provided in the steering or the driver's seat. In this case, the user interface 6 outputs various types of information received from the ECU 8 via the in-vehicle network, in the form of a voice signal, to notify the driver of the information. Alternatively, the user interface 6 may vibrate the vibrator according to a signal received from the ECU 8 via the in-vehicle network to notify the driver of predetermined information with this vibration. Alternatively, the user interface 6 may light up or blink the light sources according to a signal received from the ECU 8 via the in-vehicle network to notify the driver of predetermined information.

The storage device 7, which is an example of a storage unit, includes, for example, a hard disk drive, a nonvolatile semiconductor memory, or an optical medium and an access device therefor. The storage device 7 stores a high-precision map, which is an example of map information. The high-precision map includes, for example, information indicating road markings, such as lane-dividing lines or stop lines, and traffic signs on individual roads within a predetermined region represented in the high-precision map as well as information indicating features around the roads (e.g., noise-blocking walls).

The storage device 7 may further include a processor for executing, for example, a process to update a high-precision map and a process related to a request from the ECU 8 to read out a high-precision map. In this case, for example, every time the vehicle 10 moves a predetermined distance, the storage device 7 transmits a request to obtain a high-precision map, together with the current position of the vehicle 10, to the map server via the wireless communication terminal 5, and receives a high-precision map of a predetermined region around the current position of the vehicle 10 from the map server via the wireless communication terminal 5. Upon receiving a request from the ECU 8 to read out a high-precision map, the storage device 7 cuts out that portion of a high-precision map stored therein which includes the current position of the vehicle 10 and which represents a region smaller than the predetermined region, and outputs the cutout portion to the ECU 8 via the in-vehicle network.

The ECU 8 controls the vehicle 10 according to the level of autonomous driving control applied to the vehicle 10.

As illustrated in FIG. 2, the ECU 8 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 8 to the in-vehicle network. Every time positioning information is received from the GPS receiver 2, the communication interface 21 passes the positioning information to the processor 23. Every time an image is received from the camera 3-1 or 3-2, the communication interface 21 passes the received image to the processor 23. Every time a ranging signal is received from the range sensor 4, the communication interface 21 passes the received ranging signal to the processor 23. Further, the communication interface 21 passes a high-precision map read from the storage device 7 to the processor 23. Further, the communication interface 21 outputs information or a signal addressed to the user interface 6 received from the processor 23 to the user interface 6 via the in-vehicle network.

The memory 22, which is another example of a storage unit, includes, for example, volatile and nonvolatile semiconductor memories, and stores various types of data used in a vehicle control process executed by the processor 23 of the ECU 8. For example, the memory 22 stores a high-precision map; parameters of the cameras 3-1 and 3-2 indicating the focal lengths, the angles of view, the orientations, and the mounted positions; and the measurement area of the range sensor 4. The memory 22 also stores a set of parameters for specifying a classifier for object detection used for detecting traveling vehicles around the vehicle 10. In addition, the memory 22 temporarily stores sensor signals, such as images and ranging signals, the result of determination of the position of the host vehicle by the GPS receiver 2, and various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
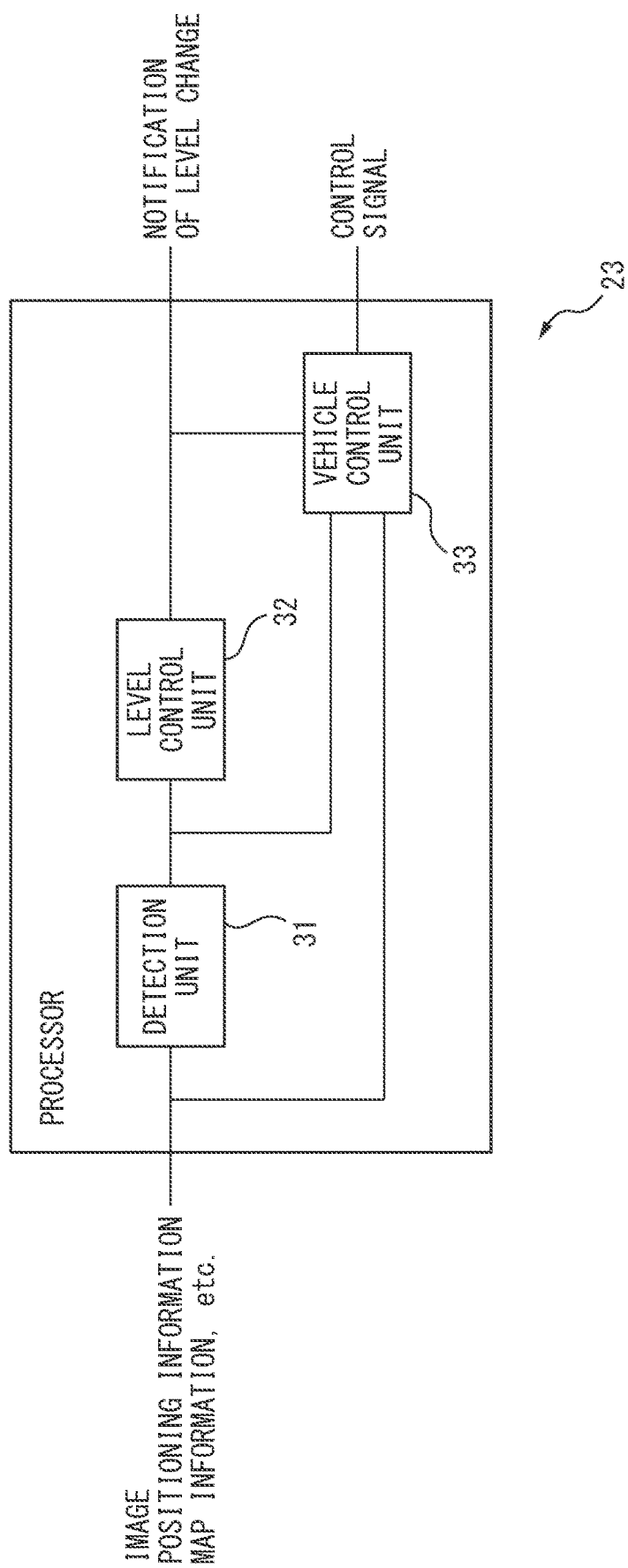
FIG. 3 is a functional block diagram of a processor of the electronic control unit, related to a vehicle control process.

FIG. 3 is a functional block diagram of the processor 23, related to the vehicle control process. The processor 23 includes a detection unit 31, a level control unit 32, and a vehicle control unit 33. These units included in the processor 23 are functional modules, for example, implemented by a computer program executed by the processor 23, or may be dedicated operating circuits provided in the processor 23.

For each sensor, the detection unit 31 determines whether the vehicle 10 may possibly collide with an object in an area therearound, based on a sensor signal obtained by the sensor, during application of autonomous driving control at the first or second driving control level to the vehicle 10. In the present embodiment, the detection unit 31 detects objects around the vehicle 10 for each image obtained from the cameras 3-1 and 3-2 and each ranging signal obtained from the range sensor 4, and determines whether the vehicle 10 may possibly collide with a detected object.

In the present embodiment, an object to be detected is one which may possibly collide with the vehicle 10, e.g., a moving object, such as another vehicle or a pedestrian, or a structure on a road being traveled by the vehicle 10, such as a signboard suggesting road construction or a fallen object on the road. Examples of an object to be detected may include stationary objects on or around a road being traveled by the vehicle 10 which affect travel of the vehicle 10, such as road markings including lane-dividing lines, traffic signs including speed signs, guardrails, and curbstones on road edges. In the following, an object to be detected will be referred to simply as an "object" or a "target object."

For example, the detection unit 31 inputs an image obtained from the camera 3-1 or 3-2 into a classifier for object detection to detect target objects. As such a classifier, the detection unit 31 can use a deep neural network (DNN) having architecture of a convolutional neural network (CNN) type, such as Single Shot MultiBox Detector (SSD) or Faster R-CNN.

Alternatively, the detection unit 31 may use a classifier based on another machine learning technique, such as an AdaBoost classifier. Such a classifier is trained in advance in accordance with a predetermined training technique, such as backpropagation, so as to detect target objects around the vehicle 10 from an image. The classifier outputs information for identifying an object region including an object detected in the inputted image and information indicating the type of the detected object.

Further, the detection unit 31 detects lane-dividing lines and a lane being traveled by the vehicle 10 (hereafter a "host vehicle lane"). In the present embodiment, the detection unit 31 detects lane-dividing lines by inputting an image obtained from the camera 3-1 or 3-2 into the classifier. The detection unit 31 can determine a lane corresponding to a region sandwiched between two lane-dividing lines closest to the horizontal center of the image on the respective sides with respect to the horizontal center, as the host vehicle lane. In addition, the detection unit 31 estimates the position of the vehicle 10 at the time of generation of each image. To this end, the detection unit 31 compares the image with a high-precision map to determine the position of the vehicle 10 for the case where features represented in the image match corresponding features represented in the high-precision map the best, thereby estimating the position of the vehicle 10.

In addition, the detection unit 31 detects objects around the vehicle 10, based on a ranging signal. In this case also, the detection unit 31 inputs a ranging signal into a classifier that has been trained to detect objects around the vehicle 10 from a ranging signal, thereby detecting objects around the vehicle 10. Alternatively, the detection unit 31 may detect objects around the vehicle 10 in accordance with another technique to detect an object from a ranging signal.

The detection unit 31 determines whether the vehicle 10 may possibly collide with a detected object. To achieve this, the detection unit 31 tracks each detected object and thereby predicts a trajectory to a predetermined time ahead along which the object will pass. Specifically, based on past sensor signals generated by a sensor that has generated the sensor signal representing the detected object, the detection unit 31 tracks the object. For example, when an object of interest is detected from the latest image generated by the camera 3-1, the detection unit 31 tracks the object over a series of images generated in a past certain period by the camera 3-1. When an object of interest is detected from the latest ranging signal generated by the range sensor 4, the detection unit 31 tracks the object over a series of ranging signals generated in a past certain period by the range sensor 4.

For each object being tracked, the detection unit 31 calculates the distance between the position of the object on the predicted trajectory (hereafter a "predicted positions") and a predicted position of the vehicle 10 at each time in the future. When the distance from the predicted position of the vehicle 10 to one of the objects being tracked falls below a predetermined threshold at a certain time, the detection unit 31 determines that the vehicle 10 may possibly collide with the object being tracked.

The following describes tracking of an object detected from an image generated by the camera 3-1 and estimation of a predicted trajectory. The detection unit 31 also tracks an object detected from an image generated by the camera 3-2 and estimates a predicted trajectory, based on the result of tracking, in accordance with a technique similar to that described below.

For example, the detection unit 31 applies a tracking process based on optical flow, such as the Lucas-Kanade method, to an object region of interest in the latest image and object regions in past images, thereby tracking the object represented in the object regions. To this end, the detection unit 31 applies, for example, a filter for extracting feature points, such as SIFT or Harris operator, to the object region of interest, thereby extracting feature points from the object region. The detection unit 31 then identifies those points in the object regions in the past images which correspond to the feature points in accordance with the applied tracking technique, thereby calculating optical flow. Alternatively, the detection unit 31 may apply another tracking technique applied for tracking a moving object detected from an image to the object region of interest in the latest image and the object regions in the past images, thereby tracking the object represented in the object regions.

For each object being tracked, the detection unit 31 executes viewpoint transformation, using information such as the direction of the optical axis, the focal length, and the height of the mounted position of the camera 3-1, thereby transforming the image coordinates of the object into coordinates in an aerial image ("aerial-image coordinates") with respect to the position of the camera 3-1. The detection unit 31 then executes a prediction process on aerial-image coordinates obtained from a series of images obtained during tracking, using a Kalman filter or a particle filter and the positions of the vehicle 10 at the times of generation of these images. In this way, the detection unit 31 can estimate a predicted trajectory of the object to a predetermined time ahead.

For an object of interest detected from a ranging signal, the detection unit 31 compares that set of bearing angles including the object which is identified in a ranging signal at a certain time with the subsequently obtained ranging signal. The detection unit 31 then determines that the object of interest is included in a set of bearing angles in the subsequently obtained ranging signal whose degree of matching with the identified set is not less than a predetermined threshold. To this end, the detection unit 31 calculates the degree of matching, for example, based on the sum of the differences between corresponding bearing angles in the two sets of bearing angles compared with each other. The detection unit 31 tracks the object detected from a ranging signal by repeating the above-described process on time-series ranging signals. The detection unit 31 estimates a predicted trajectory of the object by executing a prediction process similar to that described above on those positions of the object at the times of generation of the ranging signals which are estimated from the positions of the vehicle 10 at the times of generation of the ranging signals and the directions and distances from the vehicle 10 to the object in the respective ranging signals.

In addition, the detection unit 31 determines predicted positions of the vehicle 10 at respective times until a predetermined time ahead according to the latest planned trajectory set by the vehicle control unit 33.

When an object detected by one of the sensors is a type of object corresponding to a stationary object and is on the host vehicle lane ahead of the vehicle 10, the detection unit 31 may determine that the vehicle 10 may possibly collide with the object. When the object on the host vehicle lane is detected on the basis of an image generated by the camera 3-1 or 3-2, the detection unit 31 determines whether the object is a stationary object, based on the type of the object outputted by the classifier. When the object on the host vehicle lane is detected on the basis of a ranging signal, the detection unit 31 determines that the object is a stationary object, unless the result of tracking of the object as described above suggests that the position of the object varies.

In this case, the detection unit 31 estimates the distance from the vehicle 10 to the stationary object on the host vehicle lane. When the stationary object is detected on the basis of a ranging signal, the detection unit 31 determines the distance measured in the bearing of the stationary object and indicated by the ranging signal as the distance to the stationary object. When the stationary object is detected from an image, the detection unit 31 estimates the distance to the stationary object, based on the width of the host vehicle lane in the image at the position of the stationary object, the width of the host vehicle lane represented in a high-precision map at the current position of the vehicle 10, and parameters of the camera, such as the focal length.

The detection unit 31 notifies the level control unit 32 of the number of sensors that have generated sensor signals representing an object determined as possibly colliding with the vehicle 10 and the types of the sensors (the cameras 3-1 and 3-2 and the range sensor 4). Further, the detection unit 31 notifies the vehicle control unit 33 of the positions of the vehicle 10 and the host vehicle lane and an estimated distance to a stationary object detected on the host vehicle lane. In the following, an object determined as possibly colliding with the vehicle 10 will be referred to simply as a "dangerous object."

Whenever notified of the number of sensors that have generated sensor signals representing a dangerous object, the level control unit 32 controls the level of autonomous driving control applied to the vehicle 10, based on the number of sensors, in the case where the first driving control level is applied to the vehicle 10.

When a dangerous object is detected on the basis of a sensor signal of one of the sensors, the level control unit 32 changes the level of autonomous driving control applied to the vehicle 10 from the first driving control level to the second driving control level. In the present embodiment, when a dangerous object is detected on the basis of an image from the camera 3-1, an image from the camera 3-2, or a ranging signal from the range sensor 4, the level control unit 32 changes the level from the first driving control level to the second driving control level. By this change, the driver is required to look around the vehicle 10, and thus can notice the dangerous object easily. Thus, when the risk of a collision between the vehicle 10 and the dangerous object is increased, the driver can immediately take over driving control of the vehicle 10. When a dangerous object is detected from a sensor signal of only one of the sensors, an object easily mistaken as a dangerous object may be erroneously detected as a dangerous object. Termination of autonomous driving control caused by such erroneous detection decreases the driver's convenience. In the present embodiment, however, when a dangerous object is detected from a sensor signal of only one of the sensors, the level of autonomous driving control is changed to the second driving control level, and thus the driver does not need to operate the steering and accelerator. This does not greatly decrease the driver's convenience.

When a dangerous object is detected on the basis of sensor signals of two or more of the sensors, the level control unit 32 changes the level of applied autonomous driving control from the first driving control level to the third driving control level. In the present embodiment, when a dangerous object is detected on the basis of two or more of an image from the camera 3-1, an image from the camera 3-2, and a ranging signal from the range sensor 4, the level control unit 32 changes the level from the first driving control level to the third driving control level. Since detection of a dangerous object based on sensor signals of two or more sensors is unlikely to be erroneous detection, changing the level of applied autonomous driving control to the third driving control level enables the driver to control the vehicle 10 so as to avoid a collision with the dangerous object.

When a dangerous object is not detected from sensor signals of any sensor, the level control unit 32 continues autonomous driving control currently applied to the vehicle 10 without changing its level.

According to a modified example, the level control unit 32 may change the level of applied autonomous driving control to the third driving control level when a dangerous object is detected on the basis of sensor signals of two or more sensors in the case where the second driving control level is applied to the vehicle 10. This enables the driver to control the vehicle 10 so as to avoid a collision with the dangerous object, as in the case where the level of applied autonomous driving control is changed from the first driving control level to the third driving control level.

According to another modified example, the level control unit 32 may change the level of applied autonomous driving control to the first driving control level when a dangerous object has not been detected from sensor signals of any sensor for a predetermined period in the case where the second driving control level is applied to the vehicle 10. The predetermined period may be, for example, several seconds to several tens of seconds. This enables the ECU 8 to ensure safety of the vehicle 10 and to improve the driver's convenience.

When changing the level of autonomous driving control applied to the vehicle 10, the level control unit 32 notifies the driver of the change of the control level via the user interface 6. For example, when changing the level of autonomous driving control applied to the vehicle 10 to the second driving control level, the level control unit 32 notifies the driver of a warning for requesting the driver to look around the vehicle 10, via the user interface 6. To this end, the level control unit 32 causes a message or an icon representing the warning to appear on the display included in the user interface 6, or lights up or blinks a light source corresponding to the warning. Alternatively, the level control unit 32 outputs a voice signal representing the warning to the speaker included in the user interface 6, or vibrates the vibrator included in the user interface 6 in a mode of vibration (period or intensity of vibration) corresponding to the warning. In the case where the user interface 6 includes two or more of the above-mentioned devices, the level control unit 32 may notify the driver of the warning with all or some of the two or more devices.

When changing the level of autonomous driving control applied to the vehicle 10 to the third driving control level, the level control unit 32 notifies the driver of a warning that indicates transfer of driving control of the vehicle 10 to the driver, via the user interface 6. To this end, the level control unit 32 causes a message or an icon representing the warning to appear on the display included in the user interface 6, or lights up or blinks a light source corresponding to the warning. Alternatively, the level control unit 32 outputs a voice signal representing the warning to the speaker included in the user interface 6, or vibrates the vibrator included in the user interface 6 in a mode of vibration corresponding to the warning. In the case where the user interface 6 includes two or more of the above-mentioned devices, the level control unit 32 may notify the driver of the warning with all or some of the two or more devices.

When changing the level of autonomous driving control applied to the vehicle 10 to the first driving control level, the level control unit 32 notifies the driver of release from the obligation to look around the vehicle 10, via the user interface 6. To this end, the level control unit 32 causes a message or an icon indicating release from the obligation to appear on the display included in the user interface 6, or lights up or blinks a light source corresponding to the message. Alternatively, the level control unit 32 outputs a voice signal representing the message to the speaker included in the user interface 6, or vibrates the vibrator included in the user interface 6 in a mode of vibration corresponding to the message. In the case where the user interface 6 includes two or more of the above-mentioned devices, the level control unit 32 may notify the driver of the message with all or some of the two or more devices.

Figure 4A:
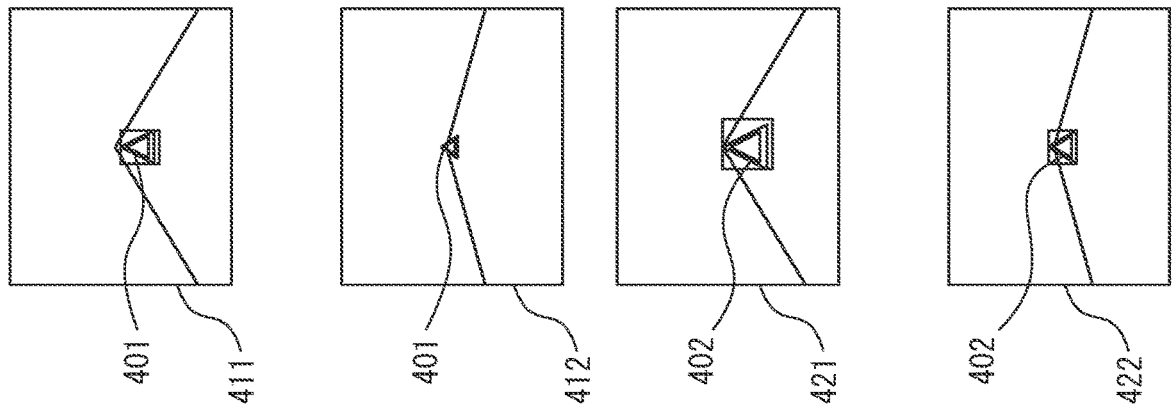
FIG. 4A illustrates an example of the relationship between the number of sensors related to detection of a dangerous object and a change of the level of autonomous driving control applied to the vehicle.
Figure 4A:
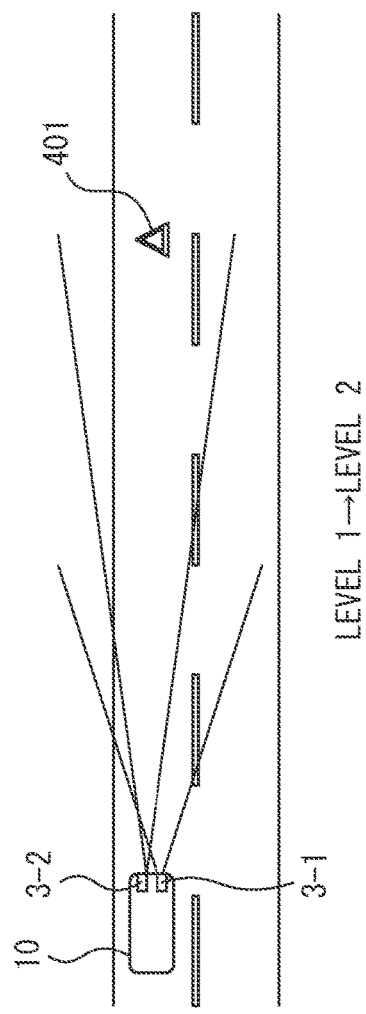
Figure 4B:
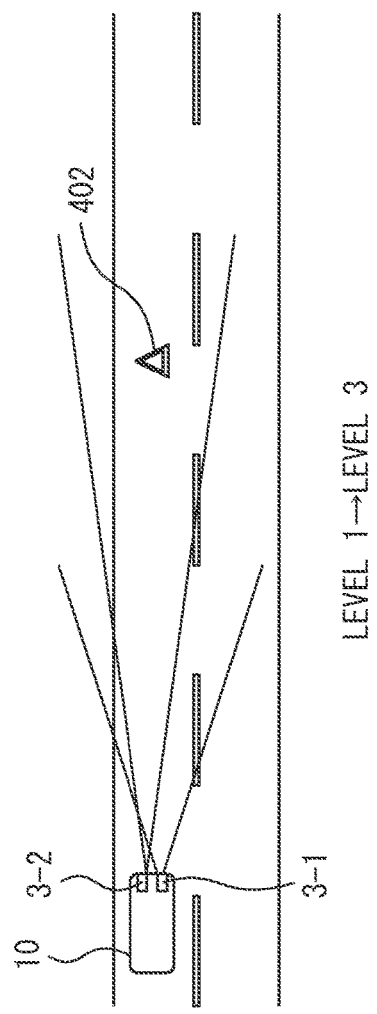
FIG. 4B illustrates an example of the relationship between the number of sensors related to detection of a dangerous object and a change of the level of autonomous driving control applied to the vehicle.

FIGS. 4A and 4B illustrate examples of the relationship between the number of sensors related to detection of a dangerous object and a change of the level of autonomous driving control applied to the vehicle 10.

In the example illustrated in FIG. 4A, a dangerous object 401 is detected from an image 411 obtained by the camera 3-2. However, since the dangerous object 401 is far from the vehicle 10, the dangerous object 401, which is represented in an image 412 obtained by the camera 3-1, is too small in the image 412 to be detected from the image 412. Further, the dangerous object 401 is not detected from ranging signals obtained by the range sensor 4. Hence the level control unit 32 changes the level of autonomous driving control applied to the vehicle 10 from the first driving control level to the second driving control level.

In the example illustrated in FIG. 4B, a dangerous object 402 is detected not only from an image 421 obtained by the camera 3-2 but also from an image 422 obtained by the camera 3-1. Hence the level control unit 32 changes the level of autonomous driving control applied to the vehicle 10, from the first driving control level to the third driving control level.

After a predetermined time from the above-described notification of the change of the level of autonomous driving control, the level control unit 32 changes the level of autonomous driving control applied to the vehicle 10 to the notified driving control level.

Whenever changing the level of autonomous driving control applied to the vehicle 10, the level control unit 32 notifies the vehicle control unit 33 of the control level after the change.

The vehicle control unit 33 controls the vehicle 10 according to the level of autonomous driving control applied to the vehicle 10.

For example, when the level of autonomous driving control applied to the vehicle 10 is the first or second driving control level, the vehicle control unit 33 sets a trajectory to be traveled by the vehicle 10 until a predetermined time ahead (hereafter a "planned trajectory"). The planned trajectory is represented, for example, as a set of target positions of the vehicle 10 at respective times during travel of the vehicle 10 through a predetermined section.

The vehicle control unit 33 sets a planned trajectory by referring to a high-precision map so that the vehicle 10 may travel along a planned travel route to a destination. For example, when the host vehicle lane extends along the planned travel route, the vehicle control unit 33 sets a planned trajectory along the center of the host vehicle lane. When the planned travel route leads to a road that diverges from the road being currently traveled at a predetermined distance, the vehicle control unit 33 sets a planned trajectory so that a lane change will be made from the host vehicle lane to a lane from which the diverging road can be entered.

Upon setting a planned trajectory, the vehicle control unit 33 controls components of the vehicle 10 so that the vehicle 10 travels along the planned trajectory. For example, the vehicle control unit 33 determines a target acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 is equal to the target acceleration. The vehicle control unit 33 then determines the amount of fuel injection according to the set degree of accelerator opening, and outputs a control signal depending on the amount of fuel injection to a fuel injector of an engine of the vehicle 10. Alternatively, the vehicle control unit 33 controls a power supply of a motor for driving the vehicle 10 so that electric power depending on the set degree of accelerator opening is supplied to the motor. Alternatively, the vehicle control unit 33 outputs a control signal depending on the set amount of braking to the brake of the vehicle 10. In addition, the vehicle control unit 33 determines the steering angle of the vehicle 10 for the vehicle 10 to travel along the planned trajectory, based on the planned trajectory and the current position of the vehicle 10, and outputs a control signal depending on the steering angle to an actuator (not illustrated) that controls the steering wheel of the vehicle 10.

In some cases, the driver may not take necessary action even after a predetermined period from notification to the driver of the change of the level of autonomous driving control applied to the vehicle 10 to the second or third driving control level. In such a case, the vehicle control unit 33 may control the vehicle 10 to stop the vehicle 10. Whether the driver has taken necessary action is determined, for example, based on an interior image generated by a driver monitoring camera (not illustrated) provided in the interior of the vehicle 10 or a detection signal generated by a touch sensor (not illustrated) provided in the steering. For example, the vehicle control unit 33 detects the driver's looking direction or face orientation from an interior image, and determines whether the driver is looking ahead of the vehicle 10, based on the result of detection. When the driver is looking ahead of the vehicle 10, the vehicle control unit 33 determines that the driver is looking around the vehicle 10, which is necessary for applying the second driving control level. Further, in the case where it is determined that the driver is looking ahead of the vehicle 10, based on an interior image, and where a detection signal indicating that the driver is holding the steering wheel is received from the touch sensor, the vehicle control unit 33 determines that the driver is ready for driving control of the vehicle 10. In other words, the vehicle control unit 33 determines that the driver is ready for application of the third driving control level. The vehicle control unit 33 detects parts of the driver's face by inputting an interior image into a classifier that has been trained to detect facial parts. As such a classifier, the vehicle control unit 33 can use, for example, a DNN having architecture of a CNN type. The vehicle control unit 33 matches the detected parts to a three-dimensional face model, while variously changing the orientation of the three-dimensional model, to detect the orientation of the face of the three-dimensional model that matches the parts the best, and determines the detected face orientation as the orientation of the driver's face. Further, the vehicle control unit 33 detects pupils and corneal reflection images of a light source included in the driver monitoring camera by executing template matching on an interior image or inputting an interior image into a classifier. The vehicle control unit 33 then detects the driver's looking direction, based on the positional relationship between the centroids of the pupils and the corneal reflection images.

FIG. 5 is an operation flowchart of the vehicle control process executed by the processor 23. While autonomous driving control at the first driving control level is applied to the vehicle 10, the processor 23 executes the vehicle control process at predetermined intervals in accordance with the operation flowchart described below.

For each sensor provided in the vehicle 10, the detection unit 31 of the processor 23 detects an object in an area around the vehicle 10, based on a sensor signal obtained by the sensor, and determines whether the detected object is a dangerous object (step S101).

The level control unit 32 of the processor 23 determines whether the number of sensors that have generated sensor signals from which the dangerous object is detected among the sensors provided in the vehicle 10 is not less than two (step S102). When the number of sensors that have generated sensor signals from which the dangerous object is detected is not less than two (Yes in step S102), the level control unit 32 changes the level of autonomous driving control applied to the vehicle 10 from the first driving control level to the third driving control level (step S103).

When the number of sensors that have generated sensor signals from which the dangerous object is detected is less than two (No in step S102), the level control unit 32 determines whether the number of sensors that have generated sensor signals from which the dangerous object is detected is one (step S104). When the number of sensors that have generated sensor signals from which the dangerous object is detected is one (Yes in step S104), the level control unit 32 changes the level of autonomous driving control applied to the vehicle 10 from the first driving control level to the second driving control level (step S105).

After step S103 or S105, the level control unit 32 notifies the driver of the change of the level of autonomous driving control via the user interface 6 (step S106).

When a dangerous object is not detected from sensor signals of any sensor in step S104 (No in step S104), the level control unit 32 continues autonomous driving control currently applied to the vehicle 10 without changing its level (step S107).

After step S106 or S107, the vehicle control unit 33 of the processor 23 controls the vehicle 10 according to the level of applied autonomous driving control (step S108). The processor 23 then terminates the vehicle control process.

As has been described above, the vehicle controller controls the level of autonomous driving control applied to the host vehicle, depending on the number of sensors that have generated sensor signals from which a dangerous object is detected among the sensors mounted on the vehicle. In particular, when a dangerous object is detected on the basis of sensor signals of two or more sensors, the vehicle controller reduces the level of autonomous driving control to a level that requires the driver to operate the accelerator or steering. When a dangerous object is detected on the basis of a sensor signal of only a single sensor, the vehicle controller reduces the level of applied autonomous driving control only to a level that requires the driver to look around but does not require the driver to operate the accelerator and steering. Thus the vehicle controller can reduce the risk of a collision of the vehicle and the frequency of application of a driving control level that requires the driver's involvement, which improves the driver's convenience.

According to a modified example, when changing the level of autonomous driving control applied to the vehicle 10 from the first driving control level to the second driving control level, the level control unit 32 may request the driver to look around the vehicle 10 and to hold the steering wheel. In this case, the level control unit 32 notifies the driver of a warning for requesting the driver to look around the vehicle 10 and to hold the steering wheel, via the user interface 6.

According to another modified example, the number of sensors mounted on the vehicle and being capable of detecting objects around the vehicle may be two. For example, the camera 3-1 or 3-2 or the range sensor 4 may omitted in the embodiment. In this case also, the vehicle controller can have the same advantageous effect as that in the embodiment.

The computer program for achieving the functions of the processor 23 of the ECU 8 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller capable of autonomous driving control of a vehicle at a first level that does not require a driver of the vehicle to operate an accelerator and steering and does not require the driver to look around the vehicle, a second level that requires the driver to look around the vehicle but does not require the driver to operate an accelerator and steering, or a third level that requires the driver to operate at least an accelerator or steering, the vehicle controller comprising:
a processor configured to:
detect, for each of a plurality of sensors mounted on the vehicle, an object in an area around the vehicle, based on a sensor signal from any one of the plurality of sensors, the sensors being capable of detecting objects around the vehicle,
determine whether the vehicle may possibly collide with the detected object,
change the level of autonomous driving control applied to the vehicle from the first level to the second level when an object determined as possibly colliding with the vehicle is detected on the basis of the sensor signal of one of the sensors in the case where autonomous driving control at the first level is applied to the vehicle, and
change the level of autonomous driving control applied to the vehicle from the first level to the third level when an object determined as possibly colliding with the vehicle is detected on the basis of the sensor signals of two or more of the sensors.

2. The vehicle controller according to claim 1, wherein the processor is further configured to change the level of autonomous driving control applied to the vehicle from the second level to the third level when an object determined as possibly colliding with the vehicle is detected on the basis of the sensor signals of two or more of the sensors in the case where autonomous driving control at the second level is applied to the vehicle.

3. The vehicle controller according to claim 1, wherein the processor is further configured to change the level of autonomous driving control applied to the vehicle from the second level to the first level when an object determined as possibly colliding with the vehicle has not been detected from any of the sensor signals of the sensors for a predetermined period in the case where autonomous driving control at the second level is applied to the vehicle.

4. A method for vehicle control enabling autonomous driving control of a vehicle at a first level that does not require a driver of the vehicle to operate an accelerator and steering and does not require the driver to look around the vehicle, a second level that requires the driver to look around the vehicle but does not require the driver to operate an accelerator and steering, or a third level that requires the driver to operate at least an accelerator or steering, the method comprising:
detecting, for each of a plurality of sensors mounted on the vehicle, an object in an area around the vehicle, based on a sensor signal from any one of the plurality of sensors, the sensors being capable of detecting objects around the vehicle;
determining whether the vehicle may possibly collide with the detected object;
changing the level of autonomous driving control applied to the vehicle from the first level to the second level when an object determined as possibly colliding with the vehicle is detected on the basis of the sensor signal of one of the sensors in the case where autonomous driving control at the first level is applied to the vehicle; and
changing the level of autonomous driving control applied to the vehicle from the first level to the third level when an object determined as possibly colliding with the vehicle is detected on the basis of the sensor signals of two or more of the sensors.

5. A non-transitory recording medium that stores a computer program for vehicle control enabling autonomous driving control of a vehicle at a first level that does not require a driver of the vehicle to operate an accelerator and steering and does not require the driver to look around the vehicle, a second level that requires the driver to look around the vehicle but does not require the driver to operate an accelerator and steering, or a third level that requires the driver to operate at least an accelerator or steering, the computer program causing a processor mounted on the vehicle to execute a process comprising:
detecting, for each of a plurality of sensors mounted on the vehicle, an object in an area around the vehicle, based on a sensor signal from any one of the plurality of sensors, the sensors being capable of detecting objects around the vehicle;
determining whether the vehicle may possibly collide with the detected object, the sensors being capable of detecting objects around the vehicle;
changing the level of autonomous driving control applied to the vehicle from the first level to the second level when an object determined as possibly colliding with the vehicle is detected on the basis of the sensor signal of one of the sensors in the case where autonomous driving control at the first level is applied to the vehicle; and
changing the level of autonomous driving control applied to the vehicle from the first level to the third level when an object determined as possibly colliding with the vehicle is detected on the basis of the sensor signals of two or more of the sensors.

* * * * *